United States Patent [19]

Ueno

[11] 4,113,202
[45] Sep. 12, 1978

[54] AIR-BORNE TRANSPORTATION SYSTEM CONVEYING TRUCK

[75] Inventor: Eijiro Ueno, Tokyo, Japan

[73] Assignee: Ueno Kohgyo Limited, Tokyo, Japan

[21] Appl. No.: 785,600

[22] Filed: Apr. 7, 1977

[30] Foreign Application Priority Data

Dec. 27, 1976 [JP] Japan .................. 52-159989

[51] Int. Cl.² ............................................. B65G 51/06
[52] U.S. Cl. ................................. 243/33; 104/138 R
[58] Field of Search ...................... 243/32, 33, 34, 35, 243/39; 104/138 R, 138 G; 105/365

[56] References Cited

U.S. PATENT DOCUMENTS

| 1,779,164 | 10/1930 | Grover | 243/39 |
| 3,734,428 | 5/1973 | Alexandrov et al. | 243/39 |

FOREIGN PATENT DOCUMENTS

| 1,122,452 | 1/1962 | Fed. Rep. of Germany | 243/34 |
| 717,569 | 1/1942 | Fed. Rep. of Germany | 243/33 |
| 1,110,086 | 6/1961 | Fed. Rep. of Germany | 243/34 |

*Primary Examiner*—Evon C. Blunk
*Assistant Examiner*—Jeffrey V. Nase
*Attorney, Agent, or Firm*—Wenderoth, Lind & Ponack

[57] ABSTRACT

A conveying truck transported by absorption force or forcing force within a transportation tube, the truck being provided at rear and front thereof with a pad for carrying wheels and a seal plate for receiving a displaceable and movable seal material within an outer peripheral groove. Each pad is supported on a rotational shaft, which projects at rear and front of the truck. By being mounted on bearings, the truck itself is rotatable relative to the pads and the seal plates.

2 Claims, 3 Drawing Figures

AIR-BORNE TRANSPORTATION SYSTEM CONVEYING TRUCK

BACKGROUND OF THE INVENTION

The present invention relates to a conveying truck transported within a transportation tube by means of an absorption or forcing device provided externally of the transportation tube, and more particularly, to a conveying truck which is designed so that the truck itself may be rotated.

In conventional conveying trucks of the type as described, wheels for supporting the truck and seal plates for maintaining air-tightness within the transportation tube are provided. However, in the trucks in which the wheels are attached to the seal plates, the seal plate has to be divided or be formed with notches, and air leaks from a wheel mount result in a decrease in conveying efficiency. Also, in the trucks in which the wheels are supported at two points, in the rear and front of the truck, when the truck passes through a bent tube path or curve within the transportation tube, the positional relation between the truck and the transportation tube varies so that it is no longer sealed within the tube, and as a result, a leakage is produced in absorption and forcing which leads to a decrease in the entire efficiency of the system.

Further, while travelling within a vertical tube path of the transportation tube, the truck is transported while revolving within the transportation tube along with the wheels, pads and seal plates secured thereto. Accordingly, an opening and closing cover on an upper surface of the truck changes position from right to left so that when the truck reaches the station, the take-out opening at the station is not registered in position with the opening and closing cover of the truck, which is a disadvantage.

SUMMARY OF THE INVENTION

It is therefore an object of this invention to provide a conveying truck in which complete sealing can always be maintained by displacement of seal members retained by seal plates even when a truck passes through a bent tube path within a transportation tube.

It is another object of this invention to provide a conveying truck in which the truck is interiorly provided at the rear and front thereof with bearings and the like to rotate the truck in order that displacement in position between an opening and closing cover disposed on an upper surface of the truck and a take-out opening at a station is brought into registration by revolution of the truck produced when the latter passes through a vertical tube path of a transportation tube.

These objects may be achieved by the present invention which provides an air-borne transportation system conveying truck to be transported within a transportation tube by absorption force by forcing force. The conveying truck of the present invention comprises pads supported through bearings or the like on rotational shafts projecting from the rear and front of the truck transported within the transportation tube, more than three wheels equally spaced on each pad, seal plates formed with an outer peripheral groove secured to each pad, and seal members displaceably and movably received in the outer peripheral groove.

BRIEF DESCRIPTION OF THE DRAWINGS

An embodiment of the present invention is shown in the accompanying drawings, in which.

DESCRIPTION OF THE PREFERRED EMBODIMENT

Figure 1:
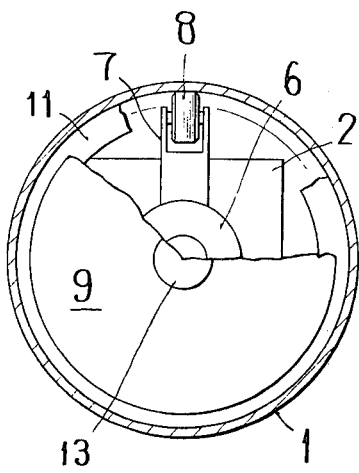
FIG. 1 is a partially cutaway side view.
Figure 2:
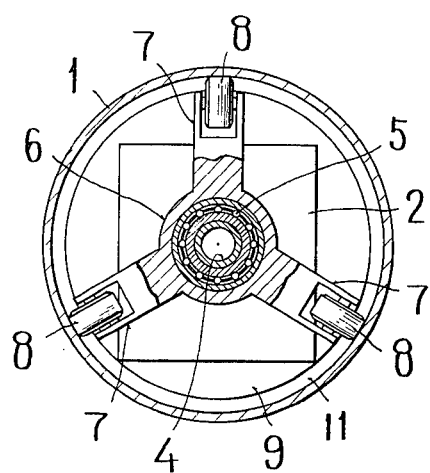
FIG. 2 is a side view with a pad portion longitudinally sectioned.
Figure 3:
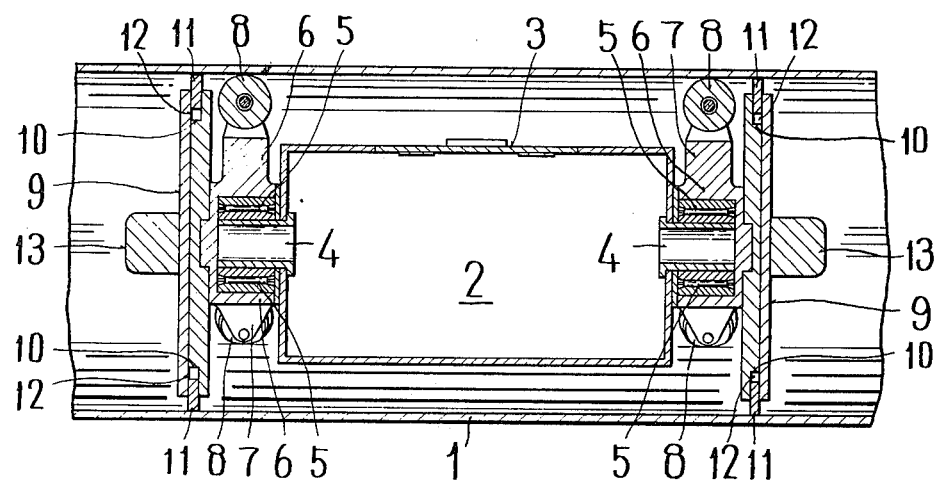
FIG. 3 is a longitudinal sectional elevation.

A transportation tube 1 is a lengthy tube which has a constant inside diameter. The tube usually includes a linear tube path portion, a bent tube path portion and a vertical tube path portion, as necessary, and the transportation tube is externally provided with an absorption or forcing device (not shown). Truck 2 to be transported by absorption force or forcing force within the transportation tube 1 comprises an opening and closing cover 3 on the upper surface thereof through which loaded articles are inserted and removed, and rotational shafts 4 project at rear and front thereof. The rotational shafts 4 supporting thereon pads 6 through bearings 5. These rear and front pads 6 have three supporting legs 7 which project therefrom in an equally spaced radial fashion, the supporting legs 7 supporting thereon wheels 8 which come into contact with the inner surfaces of the transportation tube 1. The truck 2 supported by the wheels 8 may be rotated along with the rotational shafts 4 through the bearings 5.

Seal plates 9 each formed with an outer peripheral groove 10 are secured to the rear and front pads 6, and the outer peripheral groove 10 receives therein a seal member 11 such as felt having the outside diameter which is the same in dimension as the inside diameter of the transportation tube 1. The outer periphery of the seal member 11 comes into contact with the inner surfaces of the transportation tube 1, and the seal member 11 having the inside diameter larger than the inside diameter of the outer peripheral groove 10 is movable through an annular space 12 formed by a difference of both the inside diameters so that the seal member 11 may always come into contact with the inner surfaces of the transportation tube 1 by displacement thereof. The seal member 11 comes close to the wheels 8. Reference numeral 13 designates cushions secured to the seal plates 9, which serve to relieve possible shocks produced when the truck stops at a station (not shown).

While the truck 2 is in the form of a square type in the illustrated embodiment, it is to be noted that a cylindrical truck may also be employed depending upon loaded articles. Further, while the truck has three supporting wheels 8 at the rear and front in the illustrated embodiment, it is to be noted that the number of wheels is at least more than three and maybe more.

With the foregoing construction, in the truck 2 transported within the transportation tube 1, the seal plates 9 and seal members 11 are in a coaxial state in the linear tube path portion of the transportation tube, and therefore, the truck may be transported with the opening and closing cover 3 of the truck 2 upwardly directed. However, at a bend in the tube path portion such as a lateral or vertical curve, the seal members 11 are displaced within the space 12 formed in the outer peripheral groove 10 in the seal plates 9 along the curved inner surfaces of the transportation tube 1. For example, in a downward curve, the seal members 11 are urged against the curved inner surface at the upper part of the transportation tube 1 so that the upper part of the seal members 11 are displaced upwardly within the space 12 and at the same time the lower part of the seal members 11 is also displaced upwardly and may always be displaced along the inner surfaces of the transportation tube 1, whereby sealing is maintained even if the seal plates 9 are not displaced. In this case, the opening and closing cover 3 tends to be inclined slightly as compared with the case linear tube path portion. When the truck 2 enters the vertical tube path portion it is transported while revolving in itself, and the opening and closing cover 3 of the truck 2 varies in position laterally to the running direction. Thereafter, when the truck reaches the station from the linear tube path portion, the opening and closing cover 3 will be positioned in the opposite side (lower) of the truck 2. In this case, however, the truck 2 may be rotated by hands or the like to easily register with the take-out opening at the station.

In accordance with the present invention constructed as described above, the seal plates, which are simple in construction, may merely be secured adjacent the wheels of the truck to maintain a sealing function between the truck and the transportation tube, and the truck may be transported easily and efficiently without losing absorption or forcing force from the absorption apparatus or forcing apparatus. Further, the truck supported on the wheels may be rotated through the interiorly disposed bearings or the like so that the opening and closing cover of the truck may easily be brought into registration with the take-out opening at the station. Moreover, the transportation tube may freely be applied depending upon various portions or places such as linear portion, vertical portion, and small-diameter bended portion, only requiring a minimal installation area.

What is claimed is:

1. An air-borne transportation vehicle for transporting articles through a transportation tube, said vehicle comprising:
   a container within said tube;
   a closeable cover on one side of said container;
   rotational cylindrical shafts projecting from opposite ends of said container;
   bearings surrounding and movable about each of said shafts;
   pads mounted on the circumference of said bearings, whereby said pads can rotate about said shafts on said bearings;
   at least three support legs attached to and equally spaced about each of said pads, said legs extending radially from said pads;
   at least one wheel rotatably mounted on each of said legs and in contact with the inside of said tube;
   seal plates secured to the ends of said pads and longitudinally spaced from said legs and wheels, said seal plates each having a circumferential groove therearound;
   seal member means slidably fitted into said groove in said seal plate and projecting against the inside of said tube for slidably sealing said container and said legs and wheels supporting said container in said tube; and
   cushion means on the outsides of said seal plates for absorbing shocks when said vehicle hits an object in said tube.

2. A vehicle as claimed in claim 1, wherein said seal member means is a felt pad fitted into said circumferential groove, the outside diameter of said felt pad being substantially the same as the inside diameter of said tube and the inside diameter of said pad fitted in said groove being larger than the diameter of said groove.

* * * * *